Jan. 9, 1962 F. A. KIRSTEN 3,016,475
PHASE DIFFERENTIAL INDICATING CIRCUIT
Filed Aug. 19, 1960
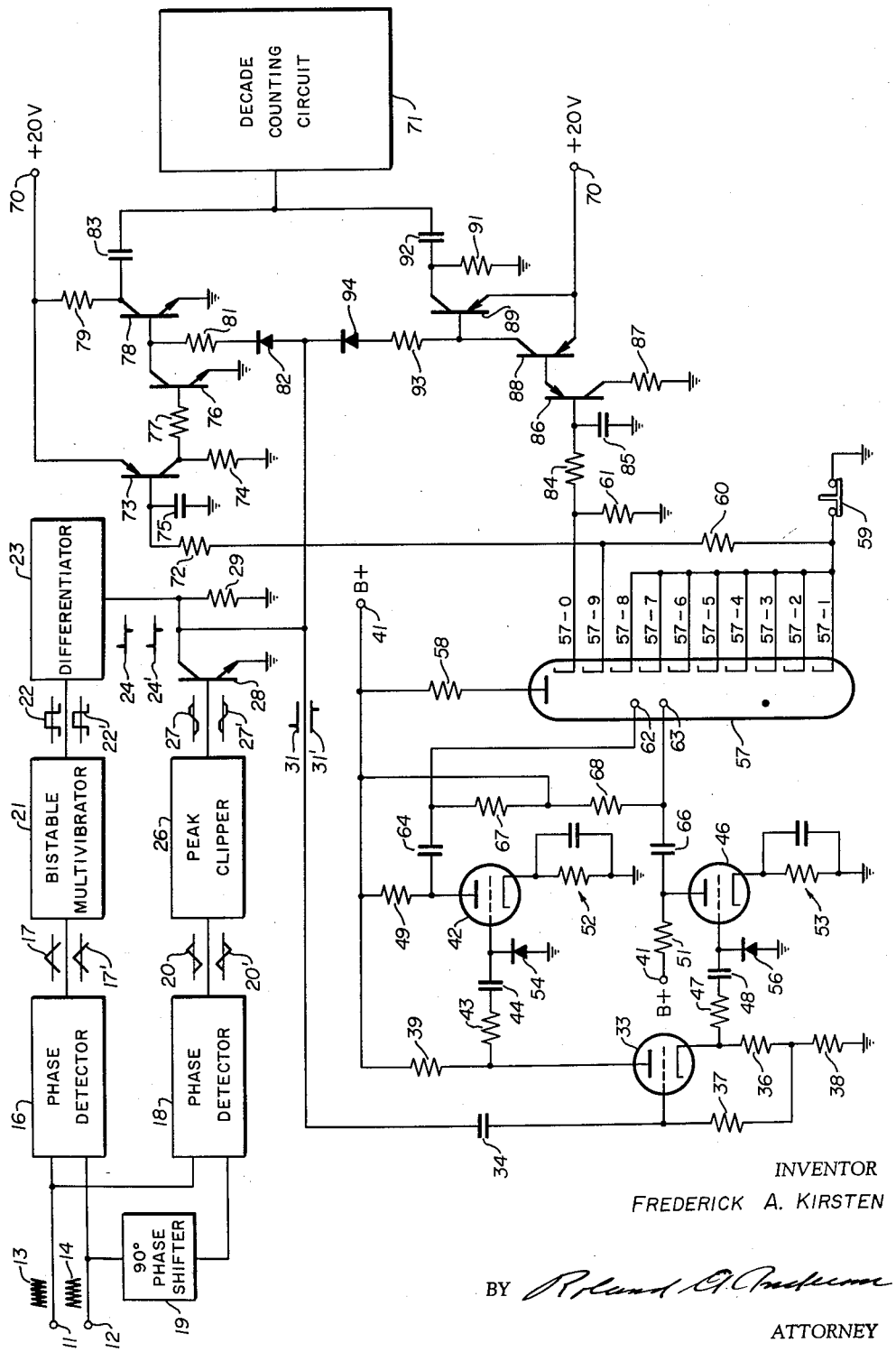
INVENTOR
FREDERICK A. KIRSTEN
BY
ATTORNEY United States Patent Office 3,016,475
Patented Jan. 9, 1962

3,016,475
PHASE DIFFERENTIAL INDICATING CIRCUIT
Frederick A. Kirsten, Lafayette, Calif., assignor to the United States of America as represented by the United States Atomic Energy Commission
Filed Aug. 19, 1960, Ser. No. 50,814
9 Claims. (Cl. 315—84.6)

The present invention relates to electronic counting circuitry and more particularly to a system for indicating the net accumulated phase difference between two continuing input signals, the circuit registering either additive or subtractive counts depending upon the direction of phase change.

The invention was developed for usage with a dual pulse generator of the type wherein the time delay between pulse pairs is determined by the phase difference between two input signals. In the pulse generator, the phase relationship between a secondary oscillator and a master oscillator is detected by phase comparison of corresponding harmonics of both oscillators. By counting the cycles of phase difference between the two harmonic frequencies, the phase difference between the secondary and master oscillator outputs is known to a high degree of accuracy, assuming a known initial phase relationship. A pair of pulse generators triggered by the ouputs of the master and secondary oscillators have a time difference between output pulses related to the phase difference between the harmonic frequencies. For control purposes it is necessary that the net phase difference between the harmonic signals be detected and indicated after the initial calibration. The frequencies may be varied relatively in either direction so that both additive and subtractive phase changes must be detected. Each 360° of phase change is recorded as one count on electronic counting tubes. The present invention provides a means for detecting and indicating the foregonig accumulative phase change and utilizes a novel glow transfer tube circuit to accomplish this result.

The glow transfer tube is extensively used for counting electronic pulses. Such tubes have a plurality of cathodes disposed in a circle around a central anode and, with proper operating potentials, a glow discharge is established between the anode and one of the cathodes. Count transfer signals are applied to two guide electrodes disposed between each pair of cathodes. The glow discharge may be transferred from one cathode to an adjacent cathode by applying appropriate pulse signals to the guide electrodes in succession. The cathodes are generally numbered from 0 to 9 and an operator can easily note the particular cathode at which the glow discharge occurs. By applying input signals in the form of electrical pulses to circuitry associated with the counting tube, the glow discharge is successively transferred around the tube and the total number of input pulses may be determined by noting the initial cathode position of the glow discharge and the final position. The sequence by which the guide electrodes are activated determine the direction, positive or negative of the count.

Single input counting circuits of the class using glow transfer tubes have not heretofore been adapted to register subtractive counts upon the receipt of an input pulse of opposite polarity from that of the normal additive count. As noted above a circuit having this ability is more flexible and generally useful than one which can simply total pulses.

In the present invention, counting tubes are utilized for indicating the net difference in phase between two input signals of varying frequency, the count starting at zero at some particular time and providing a running account of the net difference in phase. The counting circuit must record both additive and substractive counts as the frequency of one signal may vary either above or below the frequency of the other signal, the counting circuit adding counts for the first condition and subtracting counts for the latter condition. Each count denotes a 360° difference in phase between the two compared input signals.

The invention operates by mixing the two input frequencies and producing two beat frequency signals equal to the frequency difference between the input signals. A pulse signal is produced having a frequency equal to the beat frequency and a polarity dependent upon the direction of the phase change between the two input signals. A counting circuit utilizing glow discharge counting tubes receives the pulse input signals and totalizes the difference between the positive and negative pulses. For instance, the positive pulses might be added and the negative pulses subtracted. By decading the counting tubes the highest count possible can be extended indefinitely. Either positive or negative numbers are indicated. The input signals are passed from a single input through two parallel circuits each having an output coupled to a guide electrode in the glow transfer tube. Input signals of positive polarity are delayed in one circuit and not delayed in the other while input pulses of negative polarity are delayed in the second circuit and not delayed in the first circuit, thereby the sequence in which the guide electrodes are activated is dependent upon input pulse polarity. For one sequence the counting tube adds while for the opposite sequence the counting tube subtracts. Thus the net difference in the number of positive and negative pulses received at a single input terminal can be indicated.

It is an object of this invention to provide a counting circuit capable of registering either additive or subtractive counts depending upon the polarity of input pulses received at a single input terminal.

It is another object of the present invention to provide an electronic circuit for accurately counting the phase differential between two independent alternating frequency signals.

It is a further object of this invention to provide a means for registering difference in the number of completed cycles of two signal sources after a selected starting time.

The invention, both as to its organization and method of operation together with further objects and advantages thereof will best be understood by reference to the following specification taken in conjunction with the accompanying drawing which is a circuit diagram of the invention with certain component stages thereof shown in block form.

Waveforms of voltages occurring at various parts of the circuit are shown in the drawing in schematic form and a constant or ground potential reference line is indicated with each such waveform. In the drawing, reference numerals with a superscript denote waveforms that occur under reverse input signal phase conditions from the corresponding numbers without superscript.

Referring now to the drawing, a phase detector at the input to the circuit will be described first. First and second terminals 11 and 12 are provided for receiving signals from two signal sources for which a phase comparison is desired, typical input waveforms 13 and 14 being shown in the figure. The two input signals are transmitted to a first phase detector 16 wherein the two signals are phase compared, producing a typical phase detector output signal as indicated by first phase detector waveform 17. The phase detector may be of the class typically utilizing a 6BN6 vacuum tube. A second phase detector 18, identical to the first phase detector 16, also receives and compares the phase of the input signals 13 and 14, however, the phase of the second input signal 14 is shifted in a 90° phase shifter 19 connected between the second input terminal 12 and second phase detector 18. Thus the phase of the output waveform 20 from the second phase detector 18 is shifted 90° with regard to the output 17 of the first phase detector 16.

A bistable multivibrator 21 receives the output pulse 17 of the first phase detector 16, producing a square wave signal 22. The multivibrator 21 is of the type which is triggered whenever the waveform 17 crosses the median or zero axis. A differentiator 23, receiving the multivibrator output square wave signal 22, provides an output waveform 24 having a positive pulse and a negative pulse generated by the leading edge of the square wave signal 22 and the trailing edge thereof respectively.

The maximum excursion of the output signal 20 from the second phase detector 18 is limited in a peak clipper 26 such as a zener diode, producing a clipped waveform 27. An NPN gate transistor 28 is provided which transistor has a common emitter connection wherein the emitter is connected to a steady-state potential level such as ground and the base is connected to the output of the peak clipper 26. The peak clipper 26 prevents damage to the transistor 28 by extreme negative or positive excursions of the second phase detector output signal 20. The collector of the transistor 28 is coupled to ground through an output resistor 29 and receives the pulse output 24 of the differentiator 23. When the clipped waveform 27 is positive, the transistor is essentially a short circuit and at such times the transistor 28 is conductive and shunts to ground the positive pulses in the output 24 of the differentiator 23. When the clipped waveform 27 is negative, the transistor 28 is nonconductive and the differentiator 23 output pulses are retained. The circuit of the transistor 28 may be readily replaced by other well known gate circuits while the peak clipper 26 is optional.

The positive portion of the clipped waveform 27 coincides in time with the negative pulse in the differentiator pulse output 24, only the positive pulses remaining as shown in output waveform 31. If the frequency of the first input signal 11 is lower instead of higher than the second input signal 12, then the waveforms indicated by superscript numbers occur. The first detector waveform 17', square wave signal 22', and the pulse output waveform 24' are not changed from the previous condition, but the second phase detector output waveform 20' and peak clipped waveform 27' are shifted 180° in phase. In such phase condition only the negative pulses are retained as indicated by output waveform 31'.

As will now be described, when the counting portion of the circuit receives either a negative or a positive pulse signal 31 or 31', a count is added for the former and subtracted for the latter.

A triode phase splitting or inverting tube 33 receives the output waveform 31 or 31' through a coupling capacitor 34. A grid bias potential is formed across a cathode bias resistor 36 and is coupled to the grid of tube 33 through a grid resistor 37. Signals of equal amplitude but opposite phase are formed across both a cathode resistor 38 connected in series with the cathode bias resistor 36 to ground, and across an anode resistor 39 connected from a B plus potential 41 to the anode of the tube 33. Signals are transmitted from the anode of the phase splitter tube 33 to the control grid of a first guide pulse amplifier tube 42 through a series connected coupling resistor 43 and coupling capacitor 44. Similarly, signals are coupled from the cathode of the phase splitter tube 33 to the control grid of a second guide pulse amplifier tube 46 through a series connected coupling resistor 47 and a coupling capacitor 48. Anode resistors 49 and 51 respectively are connected from the anode of the first and second guide pulse amplifiers 42 and 46 to the B plus potential 41. Cathode bias resistor and capacitor networks 52 and 53 are connected from the cathodes of the amplifiers 42 and 46 to ground. Only pulses having a positive polarity can be applied to the control grids of the first and second guide pulse amplifiers 42 and 46, since a first and second diode 54 and 56 respectively are connected to the grids and provide a very low impedance path to ground for any signal of negative polarity.

To totalize pulses from differentiator 23 which are passed by gate transistor 28, a glow transfer decade counter tube 57 is provided which tube has an anode coupled to B plus 41 through a counter tube resistor 58. As previously described, the counter tube 57 has a plurality of cathodes numbered from zero to nine. Cathodes 57–1 through 57–8 are electrically connected together and are coupled through a normally closed pushbutton switch 59 to ground. Cathodes 57–9 and 57–0 have cathode resistors 60 and 61 respectively coupled to ground so that a signal is developed on the respective cathode when the glow discharge is formed thereto. Cathode resistor 60 is coupled to ground through the pushbutton switch 59 so that operation of such switch resets the glow discharge to the 57–0 cathode for an initial count condition of zero. The counter tube 57 is of the type wherein the cathodes are disposed in a circle around the central anode. Between each neighboring pair of cathodes there is a first and second set of guide pins 62 and 63, all the pins 62 being electrically connected together and the pins 63 being similarly connected together.

The set of first guide pins 62 is connected through a coupling capacitor 64 to the anode of the first amplifier tube 42, and the set of second guide pins 63 is connected to the anode of the second amplifier tube 46 through a coupling capacitor 66. A first guide pin resistor 67 and a second guide pin resistor 68 couple the respective guide pins to B plus 41 so that ordinarily the guide pins have a positive potential with respect to the cathodes.

Considering now the operation of the components of the invention heretofore described, assume that the relative phase of the input signals 13 and 14 causes the output signal 31 to be produced wherein one positive pulse is generated for each 360° of input signal phase shift. In the phase splitter tube 33 a resultant negative pulse is produced at the anode and a concurrent positive pulse is produced at the cathode. The positive cathode pulse is coupled to the control grid of the second amplifier tube 46 and causes the second guide pin 63 to become momentarily negative so that the glow discharge from the counter tube 57 cathode then conducting is transferred to more negative adjacent guide pin 63. In the meantime, the negative pulse at the anode of the phase splitter tube 33 has been effectively coupled to ground through the low forward resistance of the first diode 54, causing electrons to be removed from the diode side of the capacitor 44. When the positive pulse 31 terminates at the control grid of the phase splitter 33, the anode polarity thereof shifts in a positive direction, causing the potential on the diode side of the capacitor 44 to go positive, thereby creating a negative pulse on the first guide pin 62. Such negative pulse causes the glow discharge to shift to the first guide pin 62 adjacent the second guide pin 63 formerly carrying the discharge. With the discharge of the positive potential on the coupling capacitor 44, the potential on the first guide pin 62 becomes positive and the glow discharge transfers to the next adjacent cathode. Each time a positive output pulse 31 is created, the glow discharge is shifted to the next cathode to provide an indication of an additional 360° of phase shift between the input signals. For illustrative purposes the glow discharge is assumed to have been shifted in a clockwise direction by the above described sequence of events. Thus the required operating conditions for the glow transfer tube are met; a negative pulse on one set of guide pins followed in time by a negative pulse on the other set of guide pins.

If the phase difference between the two input signals 13 and 14 shifts in the opposite direction from the above example, a negative output pulse 31' is applied to the phase splitter tube 33, causing a positive pulse at the anode and a negative pulse at the cathode. Consequently, a negative potential is applied to the first guide pin 62 followed by a negative poetntial on the second guide pin 63, the opposite of the sequence in the previous example. The glow discharge is shifted to the adjacent cathode in the counter-clockwise direction. Thus the two possible directions of phase shift in the input signal each produce a shift of the glow discharge in opposite directions to show the resultant accumulated balance of phase shift from a selected start time.

For instance, if the glow discharge in the decade tube 57 is initially at the 57–0 cathode, after the occurrence of a 720° positive phase shift of the input signal 13 relative to the input signal 14, the glow discharge will have been shifted clockwise to the 57–2 cathode. If subsequently there is a 1080° negative phase shift, the glow discharge will be shifted counter-clockwise to the 57–9 cathode, indicating that the net phase shift since the assumed initial start condition is 360° of negative phase shift.

Obviously, having only one decade counter tube seriously limits the range of the device, therefore, a circuit is provided for obtaining counts up to several hundred or thousand or more by including additional cascaded counter tubes. In the drawing, a circuit is shown for cascading one additional counting stage, it being understood that the maximum possible count capabilities may be extended indefinitely by further cascading of similar stages. A decade counting circuit 71 is shown in block form, the circuitry therein being a duplication of the circuitry associated with phase splitter tube 33, first and second guide pulse amplifiers 42 and 46, and the counter tube 57 as hereinbefore described. In conventional counting apparatus, a decade counting circuit is activated by every tenth input pulse by detecting the occurrence of a glow discharge to the zero cathode of the previous scaler. In the present invention the counting may be in either direction, increasing or decreasing, requiring detection of both the direction as well as the zero count.

Positive voltages developed at the cathode 57–9 are applied through a current limiting resistor 72 to the base of a PNP amplifying and phase inverting transistor 73 having an emitter connected to a plus 20 volt D.C. supply 70. A storage capacitor 75 is connected from the base to ground to provide a slow rise and fall time for input pulses. The normally positive collector is coupled to ground through a collector resistor 74 so that with a positive signal at the base of the transistor 73, current conduction therethrough ceases and no potential is developed across the collector resistor 74. A normally closed NPN switching transistor 76 has a base coupled to the collector of the phase inverting transistor 73 through a current limiting resistor 77. The grounded emitter of the switching transistor 76 holds the collector at essentially ground potential until a signal is produced at the cathode 57–9 of the counter tube 57. A grounded emitter NPN output transistor 78 has a collector coupled through a collector resistor 79 to the plus 20 volt supply 70. The collector of the switching transistor 76 is connected to the base of the output transistor 78, effectively holding the base at ground potential at all times except when the glow discharge is at the cathode 57–9 in the decade tube 57. A series connected current limiting resistor 81 and a positive pulse passing diode 82 are connected from the output of the differentiator 23 to the base of the output transistor 78, coupling only positive output pulses 31 thereto. Such pulses appear at the collector of the ouput transistor 78 in inverted form and are transmitted through an output capacitor 83 to the decade counting circuit 71. In effect, the function is that of a gating circuit, a negative pulse appearing at the collector of the output transistor 78 only when a positive gate opening control signal is received from the cathode 57–9 of the decade tube 57 in time coincidence with a positive pulse 31 through the diode 82. It will be noted that the polarity of the positive pulse 31 is thus inverted before being applied to the decade counting circuit 71.

A similar gating circuit receives the negative output pulses 31' from the differentiator and produces a positive output pulse only when such pulse 31' is in coincidence with a signal from the cathode resistor 61 of the cathode 57–0. A current limiting resistor 84 couples potentials at the 57–0 cathode to the base of a PNP amplifying transistor 86. A collector resistor 87 is connected from the collector of the amplifying and inverting transistor 86 to ground while the emitter connects to the base of a PNP switching transistor 88. A storage capacitor 85 is connected from the base of the amplifying transistor 86 to ground. The emitter of the switching transistor 88 is connected to the 20 volt power supply 70 while the collector of the transistor is connected to base of PNP output transistor 89 which also has an emitter connected to the power supply 70. Output signals are developed across an output collector resistor 91 from ground to the collector of the output transistor 89, such signals being connected through an output coupling capacitor 92 to the input of the decade counting circuit 71. A series connected current limiting resistor 93 and negative pulse conducting diode 94 pass negative output pulses 31' from the output of the differentiator 23 to the base of the output transistor 89.

In operation, the switching transistor 88 normally short circuits the base of the output transistor 89 to the power supply 70, preventing the negative output pulses 31' from being amplified by the output transistor 89 until a positive potential is simultaneously present at cathode 57–0.

As hereinbefore discussed, if the relative phase of the input signals is varying in a positive direction, positive output pulses 31 are produced at the output of the differentiator 23. Assuming all the counter tubes to be initially set at zero, the first eight pulses will shift the glow discharge in counter tube 57 to the cathode 57–8. The eight positive pulses will also have been received at the collector of the closed switching transistor 76 and shunted to ground. A ninth differentiator output pulse 31 is similarly grounded since the signal from the cathode 57–9 is delayed by storage capacitor 75 until after the cessation of output pulse 31. The tenth output pulse 31 is not shorted to ground through the open switching transistor 76 since it is now held open by a positive potential from the cathode 57–9. A resultant negative pulse is applied to the decade counting circuit 71 which responds by showing a count of one on the scaling tube therein to indicate a total of ten 360° phase shifts. A subsequent positive output pulse 31 shifts the glow discharge in the decade tube 57 to the cathode 57–1, but no pulse is applied to the decade counting circuit since the switching transistor 76 is again closed. Continuing the above example, if now the phase of the input signals shifts in the opposite direction, by following through the circuit in the above manner it will be noted that a positive pulse is applied to the decade counting circuit 71 when the glow discharge in the decade tube 57 shifts from cathode 57–0 to cathode 57–9, thereby shifting the glow discharge of the scaling tube in the counting circuit 71 back to the zero count.

While the invention has been disclosed with respect to a single embodiment, it will be apparent to those skilled in the art that numerous variations and modifications may be made within the spirit and scope of the invention and thus it is not intended to limit the invention except as defined in the following claims.

What is claimed is:

1. In a circuit for counting the net phase differential between two input signals, the combination comprising a detector circuit receiving said two input signals and providing output pulses having a positive polarity for a phase change of said input signals in one direction and having a negative polarity for a phase change of said signals in the opposite direction, a multi-electrode counting device having a discharge shiftable by a pair of pulse signals phase in accordance with the desired direction of counting and having a first and a second electrode for shifting said discharge, each of said electrodes being adapted to receive one of said phased pulse signals, a polarity inverting circuit connected to the output of said detector circuit, a first pulse delay circuit receiving the output of said polarity inverting circuit and having an output connected to said first electrode of said counting device, said first delay circuit being adapted to pass pulses of a first polarity undelayed and to delay pulses of a second polarity, a second pulse delay circuit receiving the output of said detector circuit and having an output connected to said second electrode of said counting device, said second delay circuit being adapted to pass pulses of said first polarity undelayed and to delay pulses of said second polarity.

2. In a circuit for counting the phase difference between two input signals, the combination comprising a detector circuit receiving said two input signals and providing a positive output pulse for each cycle of phase difference in one direction between said two input signals and providing a negative pulse for each cycle of phase difference in the other direction, a glow transfer counting tube having a set of first and second discharge transferring electrodes which are successively rendered conductive in the order of first and second to add counts and are rendered conductive in the order of second and first to subtract counts, a first delay circuit receiving the output of said detector circuit and delaying pulses of a first polarity and passing without delay pulses of a second polarity, the output of said first delay circuit being coupled to said first set of electrodes, an inverting circuit coupled to the output of said detector circuit, a second delay circuit receiving the output of said inverting circuit and delaying pulses of a first polarity and passing without delay pulses of a second polarity, the output of said second delay circuit being coupled to said second set of electrodes.

3. In a circuit for indicating the phase difference between two input signals, the combination comprising a first phase detector receiving said input signals, a bistable multivibrator circuit receiving the output of said first phase detector and providing an output signal having a square waveform, a differentiator receiving the output of said bistable multivibrator and producing pulse output signals, a second phase detector receiving one of said two input signals, a 90° phase shifter receiving the other of said two input signals and having an output coupled to said second phase detector, a gating circuit passing said pulse output signals from said differentiator in response to signals from said second phase detector, a phase splitter receiving the output of said gating circuit and having first and second oppositely phased output signals, a first guide pulse amplifier having a control electrode, a first capacitor coupling said first output signal to said control electrode of said first pulse amplifier, a second guide pulse amplifier having a control electrode, a second capacitor coupling said second output signal to said control electrode of said second guide pulse amplifier, a first and a second unidirectional current element each coupled to a separate one of the control electrodes of said amplifiers and each rejecting pulses of one polarity applied thereto, and a counting tube having a first and a second set of discharge shifting guide pins coupled to the outputs of said first and second amplifiers respectively.

4. In a counting circuit for adding pulses of a first polarity and subtracting pulses of a second polarity, the combination comprising an input terminal receiving said pulses, a glow discharge counting tube having a first and a second set of guide pins receiving successive pulses for shifting a glow discharge, a first guide pulse circuit coupled to said input terminal and passing pulses of said first polarity without delay and delaying pulses of said second polarity, a second guide pulse circuit coupled to said input terminal and passing pulses of said second polarity without delay and delaying pulses of said first polarity, and means coupling the outputs from said first and second guide pulse amplifiers to said first and second set of guide pins.

5. In a counting circuit for adding pulses of a first polarity and subtracting pulses of a second polarity, the combination comprising a phase splitter circuit adapted to receive said pulses at a control electrode thereof and providing a first and second output signal having opposite polarities, a glow discharge counting tube having a first and second set of guide pins adapted to receive sequentially timed pulses for progressively shifting a glow discharge to an adjacent count indicator, a first guide pulse circuit coupling said first output signal to said first set of guide pins which circuit has a time delay for pulses of a first polarity and passes pulses of a second polarity with no delay, and a second guide pulse circuit coupling said second output signal to said second set of guide pins which circuit has a time delay for pulses of a first polarity and passes pulses of a second polarity with no delay.

6. In a counting circuit for adding input pulses of one polarity and subtracting input pulses of a second polarity, the combination comprising a counter tube having a first and a second set of guide electrodes, a phase splitter tube having a control electrode with provision for receiving said input pulses and having an anode and a cathode, a first capacitor coupled from said anode to said set of first guide electrodes, a constant potential source, a first diode connected from said first capacitor to said constant potential source, a second capacitor coupled from said cathode to said second set of guide electrodes, and a second diode connected from said second capacitor to said constant potential source.

7. In a counting circuit for adding input pulses of one polarity and subtracting input pulses of a second polarity, a phase splitter tube having a control electrode receiving said input pulses and having a cathode and an anode, a first guide pulse amplifier tube having a control electrode, a first capacitor coupled from said anode of said phase splitter tube to said control electrode of said first guide pulse amplifier tube, a constant potential source, a first diode connected from said control electrode of said first guide pulse amplifier to said constant potential source, a second guide pulse amplifier tube having a control electrode, a second capacitor coupled from the cathode of said phase splitter tube to said control electrode of said second guide pulse amplifier, a second diode connected from said control electrode of said second guide pulse amplifier to said constant potential source and a counting tube having a first and a second set of guide pins coupled to the outputs of said first and second guide pulse amplifier tubes respectively.

8. A counting circuit as described in claim 7 wherein said first and second diodes each have anodes connected to said constant potential source.

9. In a counting circuit for adding input signals of a first polarity and subtracting signals of a second polarity, the combination comprising a phase splitter tube having a control electrode receiving said input pulses and having a cathode and an anode, a counter tube having a plurality of cathodes and having a first and a second set of guide electrodes a pair of which are interposed between each adjacent pair of cathodes, a first and a second guide pulse amplifier each having a control electrode, a first and second diode connected to said control electrodes of said first and second guide pulse amplifiers respectively, a first capacitor connected from said control electrode of said first guide pulse amplifier to the anode of said phase splitter tube, a second capacitor connected from said control electrode of said second guide pulse amplifier to the cathode of said phase splitter tube, a first and a second impedance connected in series with a first cathode and a second adjacent cathode of said plurality of cathodes in said counter tube, a first gating circuit receiving said input signals of said first polarity and having a gate opening control coupled to said first impedance, a second gating circuit receiving said input signals of said second polarity and having a gate opening control coupled to said second impedance, and a second counting circuit coupled to the outputs of said first and second gating circuit.

References Cited in the file of this patent

UNITED STATES PATENTS

| | | |
|---|---|---|
| 2,858,425 | Gordon | Oct. 28, 1958 |
| 2,977,538 | Secretan | Mar. 28, 1961 |